United States Patent
Cetrangolo

[19]

[11] Patent Number: 6,135,322
[45] Date of Patent: Oct. 24, 2000

[54] DISPLAY APPARATUS FOR A COLLAPSIBLE TUBE DISPENSER

[76] Inventor: Edward M. Cetrangolo, 2210 Knight Rd., Land O Lakes, Fla. 34639

[21] Appl. No.: 09/233,304

[22] Filed: Jan. 19, 1999

Related U.S. Application Data

[63] Continuation-in-part of application No. 09/087,341, May 29, 1998, abandoned.

[51] Int. Cl.[7] .................................................. B65D 35/56
[52] U.S. Cl. ........................ 222/105; 222/154; 222/192; 222/386.5; 206/459.5; 206/466
[58] Field of Search ................................ 222/78, 92, 105, 222/107, 154, 192, 386.5; 206/459.5, 461, 466

[56] References Cited

U.S. PATENT DOCUMENTS

| | | |
|---|---|---|
| 1,869,594 | 8/1932 | Johnston . |
| 2,535,671 | 12/1950 | Cutler ........................................ 222/105 |
| 2,551,176 | 5/1951 | Smith ........................................ 222/105 |
| 2,564,359 | 8/1951 | Fuller . |
| 2,996,176 | 8/1961 | Sherman .................................... 206/46 |
| 3,022,920 | 2/1962 | Croom, Jr. ............................... 222/105 |
| 3,269,604 | 8/1966 | Serry ........................................ 222/105 |
| 3,313,455 | 4/1967 | Kemmer .................................. 222/103 |
| 3,455,440 | 7/1969 | West ...................................... 206/45.31 |
| 3,724,722 | 4/1973 | Ballo ........................................ 222/105 |
| 3,746,156 | 7/1973 | Austin, Jr. et al. .................... 206/45.14 |
| 3,868,036 | 2/1975 | Wittwer ..................................... 215/12 |
| 4,020,694 | 5/1977 | Mayhew ................................... 206/461 |
| 4,657,151 | 4/1987 | Cabernoch . |
| 5,115,948 | 5/1992 | Johnson ................................... 222/209 |
| 5,143,215 | 9/1992 | Hartley et al. .......................... 206/461 |
| 5,275,311 | 1/1994 | Piarrat ..................................... 222/209 |
| 5,332,121 | 7/1994 | Schmidt et al. . |
| 5,447,255 | 9/1995 | Smedley .................................. 222/102 |
| 5,655,684 | 8/1997 | Krall ......................................... 222/91 |

Primary Examiner—Joseph A. Kaufman
Attorney, Agent, or Firm—Larson & Larson, P.A.; James E. Larson

[57] ABSTRACT

A flexible transparent polymeric sleeve encloses toiletry items or a collapsible tube dispenser. The sleeve is closed at one end where it is integral with a hanger element and open at its other end where an annular collar maintains the opening in the sleeve. A sleeve cap closes the opening or is inverted to provide a stand to display the apparatus containing a collapsible tube in a vertical position. A flexible polymeric support member consisting of two panels enclose a picture or one panel contains indicia. The support member is mounted longitudinally within the polymeric sleeve. An air release aperture is located in a bottom wall of the polymeric sleeve.

17 Claims, 5 Drawing Sheets

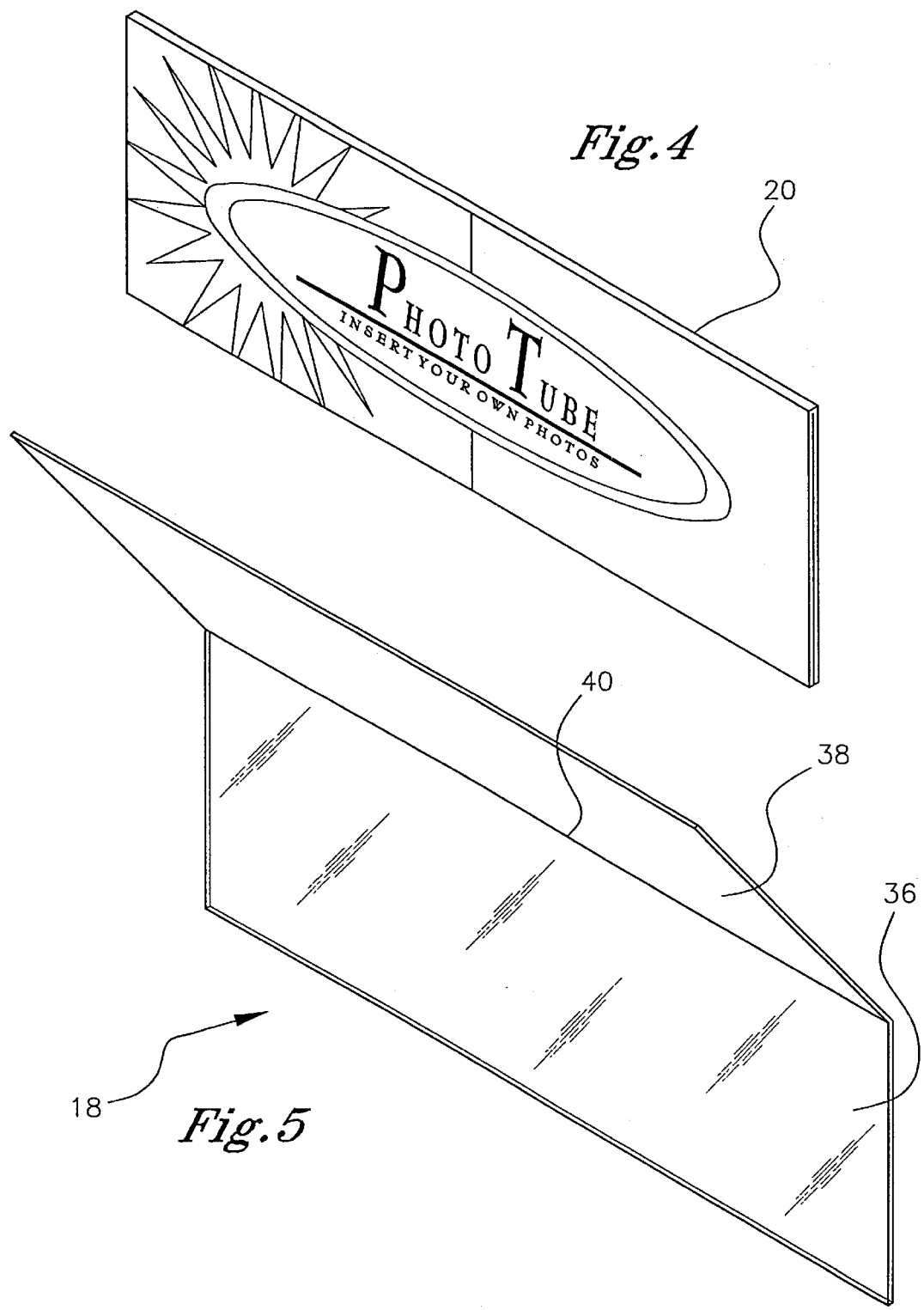

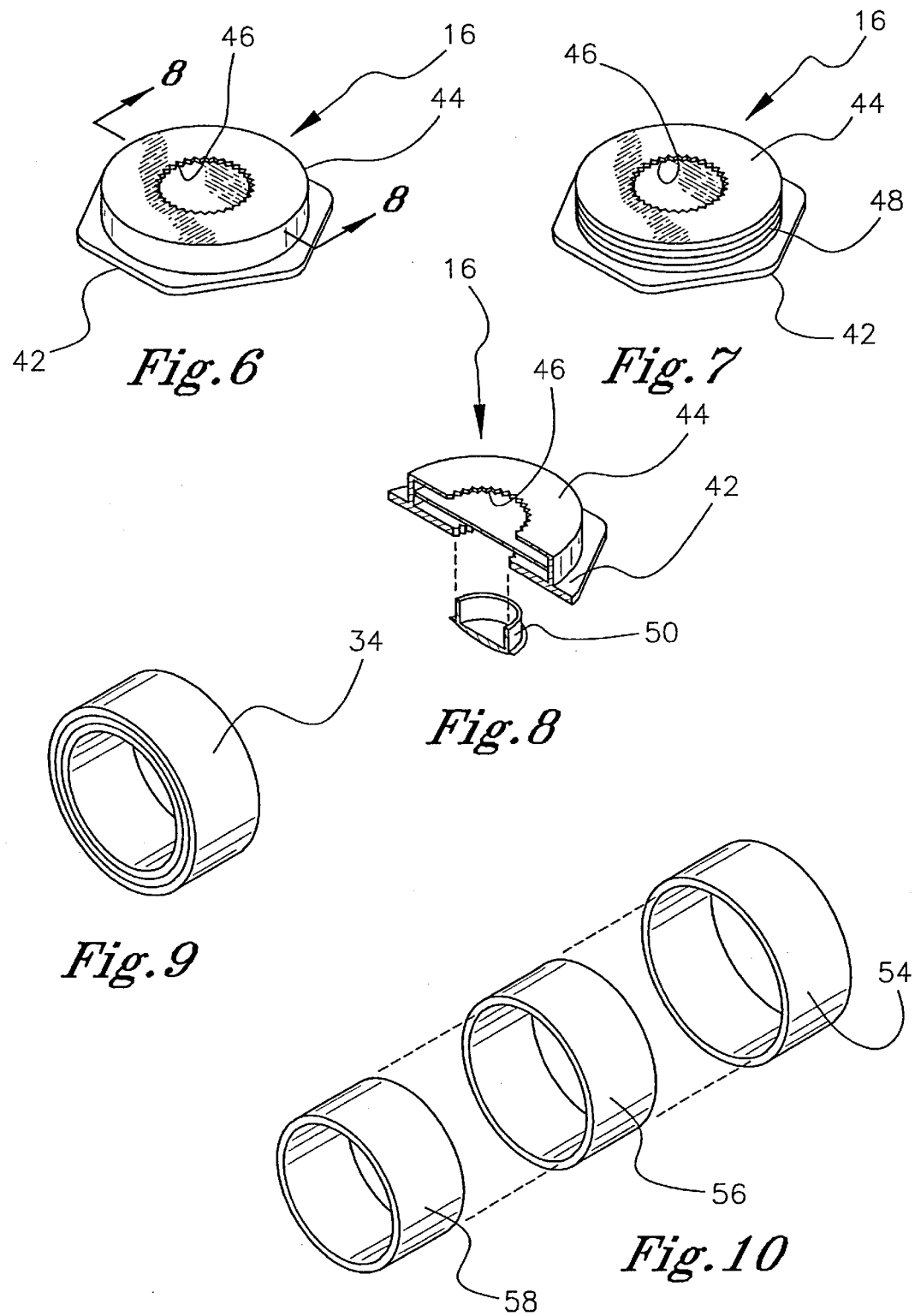

DISPLAY APPARATUS FOR A COLLAPSIBLE TUBE DISPENSER

PRIOR APPLICATION

This application is a continuation-in-part from application Ser. No. 09/087,341, filed May 29, 1998 (now abandoned).

BACKGROUND OF THE INVENTION

This invention relates to a display apparatus for use with collapsible tubes for dispensing paste products. More particularly, it refers to a clear jacket or sleeve for enclosing a squeezable tube dispenser, the jacket containing interior panels for displaying pictures and indicia.

The prior art describes apparatus used with toothpaste dispensing tubes. U.S. Pat. No. 5,447,255, describes a toothpaste dispensing apparatus designed to enclose a disposable toothpaste tube and sequentially dispense toothpaste from the tube spout by operation of a pair of spring-loaded rollers. The apparatus includes a container having a pair of longitudinal slots, a removable cap and a toothpaste dispensing valve in the cap for registering with a threaded toothpaste tube spout and dispensing toothpaste from the tube spout on demand.

In U.S. Pat. No. 5,115,948, a toothpaste dispenser having a chamber is operated by a flexible bag extending longitudinally alongside the chamber. A one way valve is provided at the bottom of the chamber through which air, under pressure, is introduced when the bag is compressed manually. A toothpaste pusher inside the chamber is moved vertically upwardly by the air under pressure introduced through the one-way valve. The toothpaste pusher takes the form of a bellows U.S. Pat. No. 3,313,455 describes a resilient tubular housing for a collapsible tube. A loop member is mounted on the tail portion of the resilient tubular housing and is slidable on the tail portion.

U.S. Pat. No. 3,455,440 describes a covering for a collapsible capped tube made from sheet material with a window opening in a front panel to permit display of an article between the sheet material.

Although the prior art devices for enclosing a collapsible tube serve their intended purposes, no prior art device provides a covering for a collapsible tube that includes advertising or picture display elements together with the elements of applicant's display apparatus.

SUMMARY OF THE INVENTION

The present invention is directed towards a display apparatus for collapsible tube dispensers that can be used for displaying a plurality of permanent or removable objects and indicia thereon. Accordingly, it is a general object of this invention to provide a displaying apparatus that will allow a plurality of indicia or photographs to be exhibited on the surface of a collapsible tube dispenser.

Another object of this invention is to provide a displaying apparatus having a flexible-supporting member, the flexible-supporting member having the properties of memory retention and enclosing indicia or photographs.

Still yet, another object of this invention is to provide a displaying apparatus having a check valve that will allow air to exit from the cavity between the flexible cover and the collapsible tube.

Another object of this invention is to provide a base stand for a collapsible tube so that it can stand on end or side wall and continue to display a picture or indicia.

BRIEF DESCRIPTION OF THE DRAWINGS

This invention, together with other objects, features, aspects and advantages thereof, will be more clearly understood from the following description, considered in conjunction with the accompanying drawings.

FIG. 4 is a perspective view of a photo or indicia sheet for enclosure with an internal supporting element.

FIG. 5 is a perspective view of the display apparatus internal supporting element.

FIG. 6 is a perspective view of a display base for receipt of a collapsible tube cap.

FIG. 7 is a perspective view of an alternate display base.

FIG. 8 is a sectional view through line 8—8 of FIG. 6.

FIG. 9 is a perspective view of a support collar for use with the display apparatus.

FIG. 10 is an exploded view of the support collar.

DETAILED DESCRIPTION OF THE INVENTION

Figure 1:
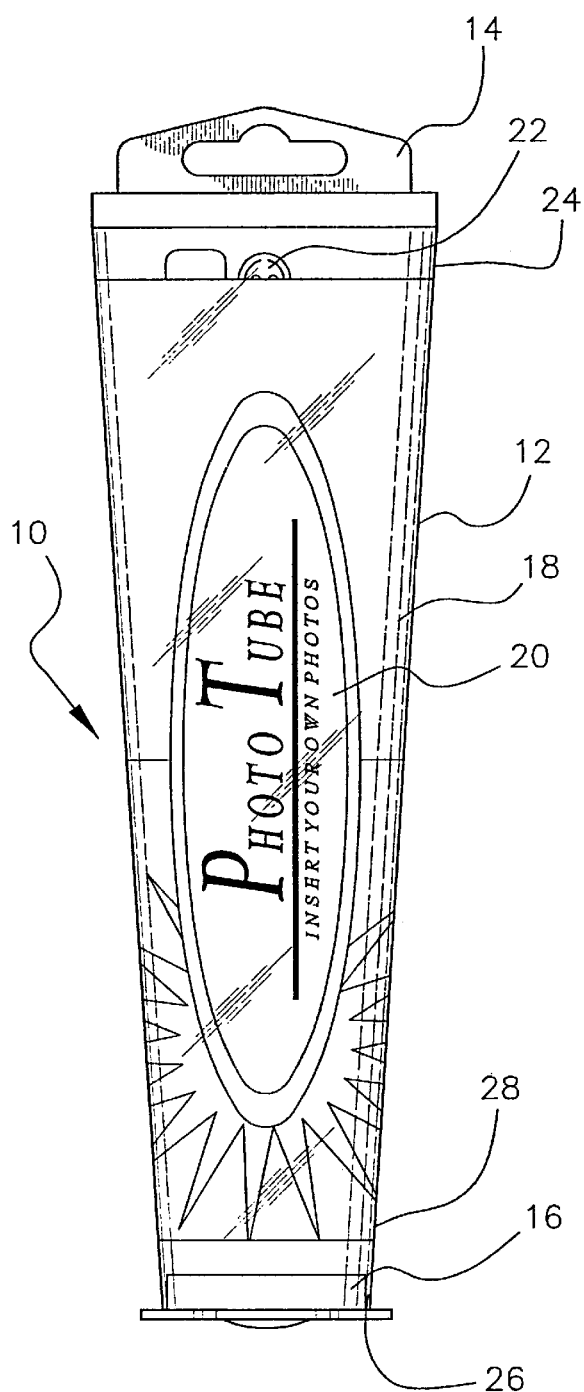
FIG. 1 is a front view of the tube dispenser display apparatus of this invention.
Figure 2:
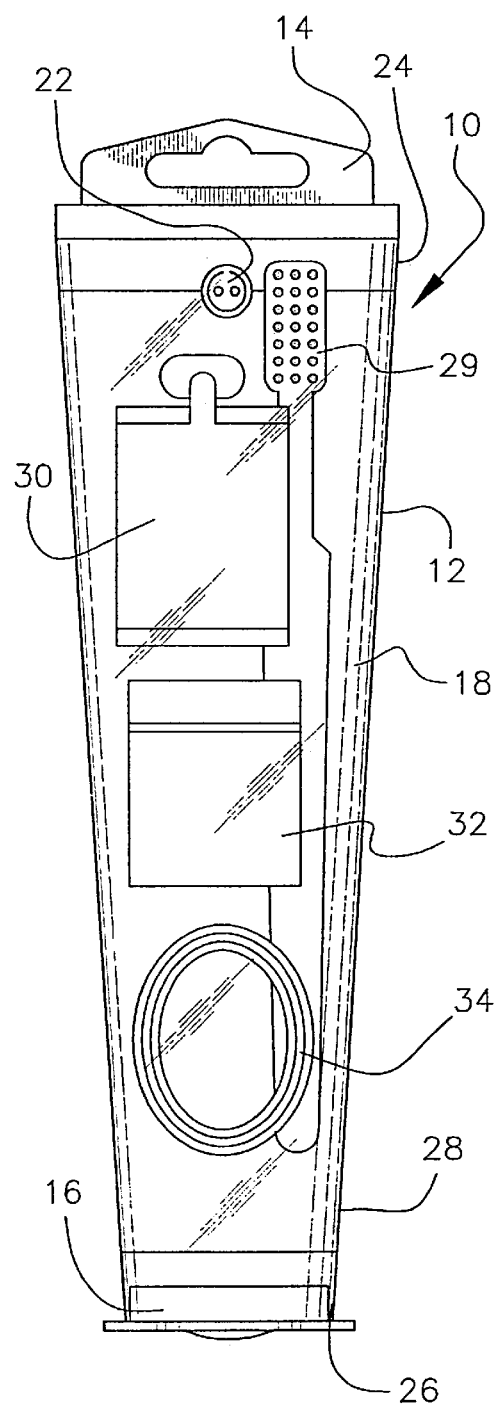
FIG. 2 is a rear view of the tube dispenser display apparatus containing sample toiletry items.
Figure 3:
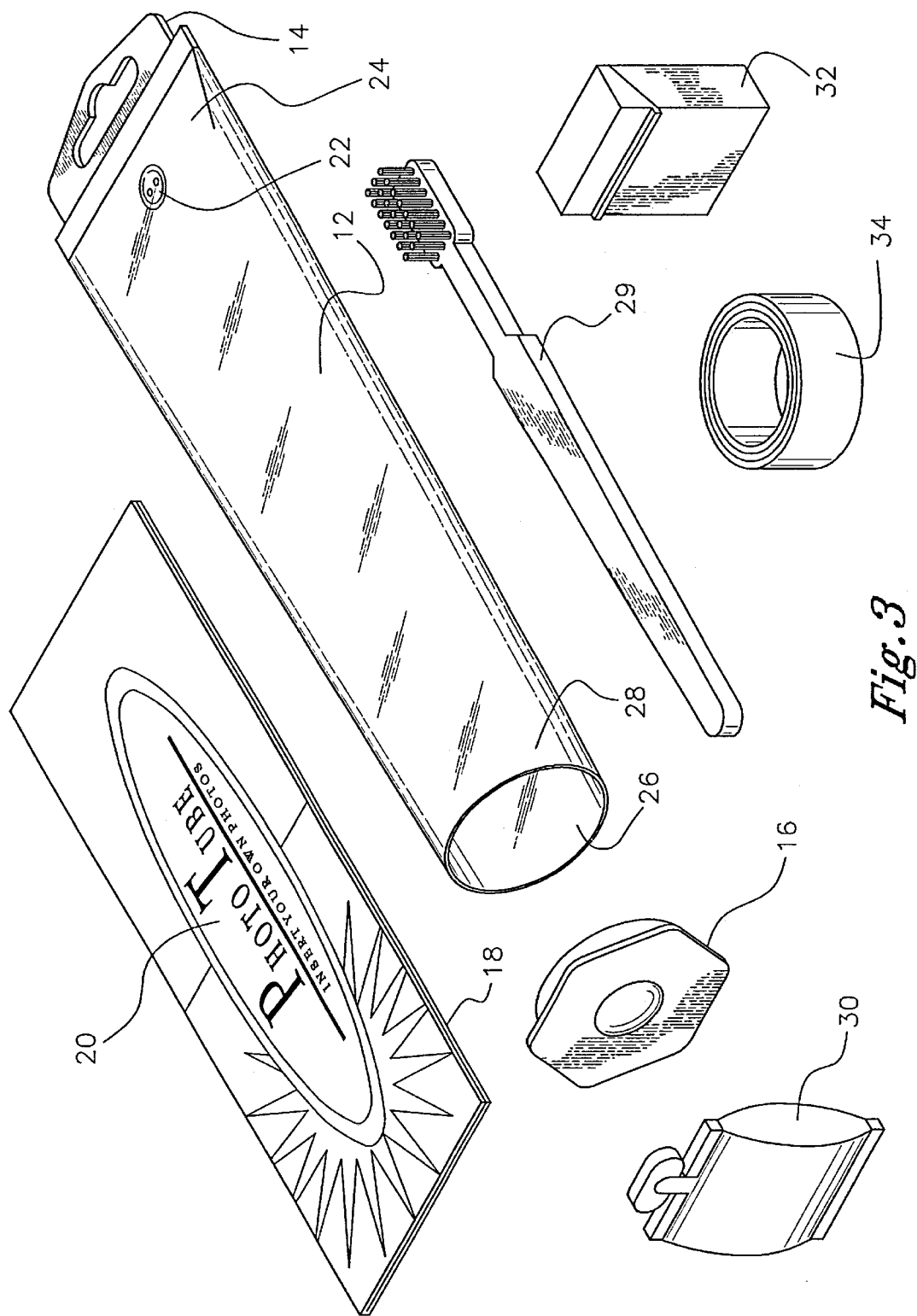
FIG. 3 is a perspective view of the various toiletry components of the display apparatus.

Throughout the following detailed descriptions, the same reference numerals refer to the same elements in all figures.

Referring to FIG. 1, a display apparatus of the invention 10 has an outer transparent sleeve 12 attached to a hanger element 14 and having a sleeve cap 16 enclosing the contents of the sleeve 12. The hanger element is used as one means of displaying the display apparatus in a vertical configuration. A flexible supporting member 18 is enclosed within sleeve 12 and contains a picture or indicia 20. An air release aperture 22 is located in a rear portion 24 of the sleeve 12. The sleeve cap 16 encloses an opening 26 in a top portion 28 of the sleeve 12.

The sleeve 12 in one mode contains toiletry items including a toothbrush 29, a small collapsible tube of toothpaste 30, a container of floss 32 and a flexible support ring 34 to be discussed hereafter. The flexible supporting member 18 as seen in FIG. 5 contains two panels 36 and 38 foldable along crease line 40. A photograph or indicia 20 is inserted between panels 36 and 38 prior to inserting the supporting member 18 into opening 26 of sleeve. At least one panel is opaque and at least a portion of the other panel is translucent to permit viewing of a photograph between the panels.

Turning to FIGS. 6–8, the cap 16 has a hexagonal top 42 integral with an annular collar 44 enclosing a serrated inner opening 46. Alternatively, as seen in FIG. 7, the sleeve cap 16, can have threads 48 on the exterior of collar 44 to engage opening 26 of sleeve 12. An insert 50 can plug the serrated opening 46 when a toothpaste tube cap 52 is not inserted into opening 46.

Figure 11:
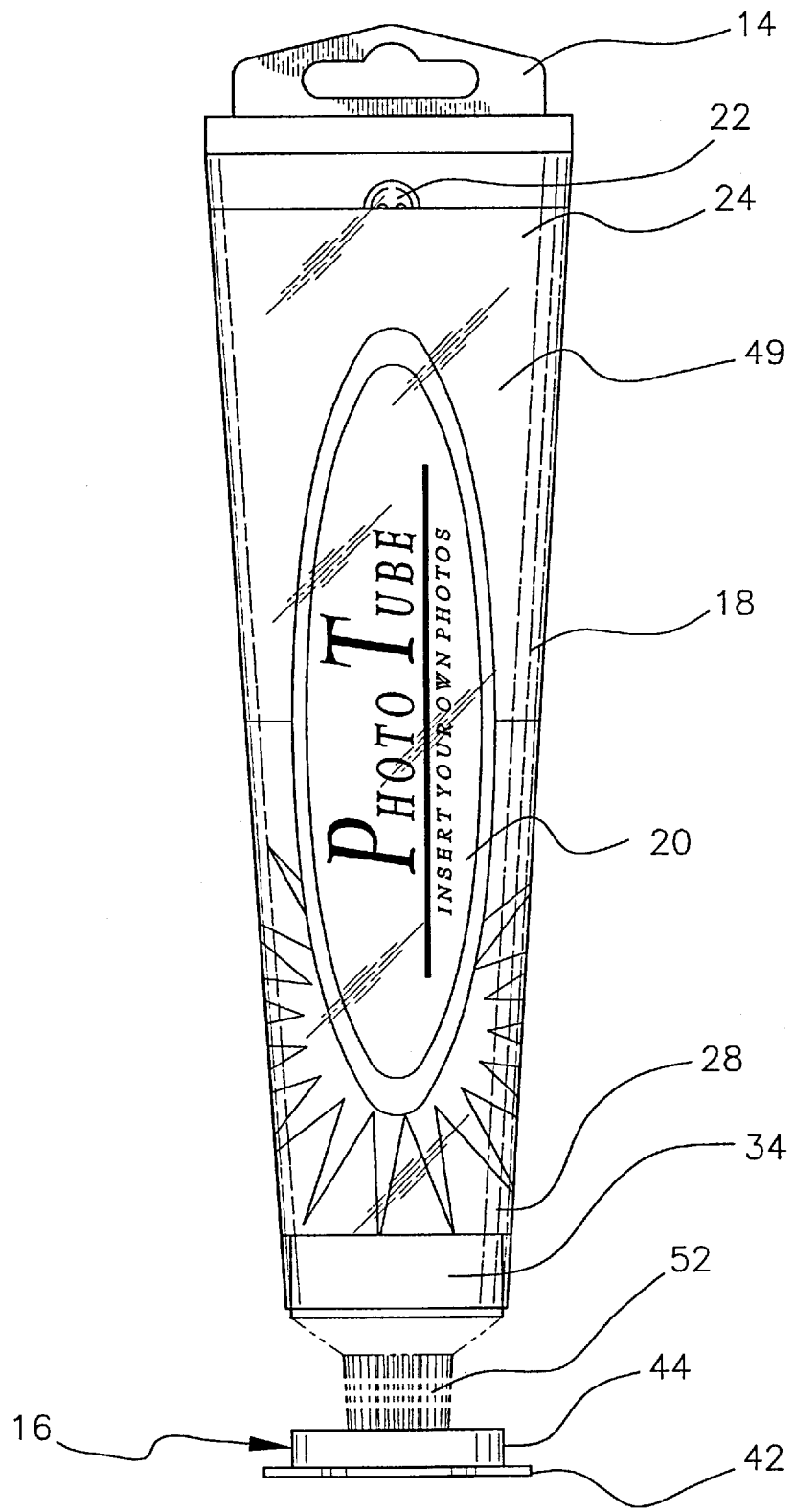
FIG. 11 is a front view of the displaying apparatus enclosing a collapsible tube with all its features set forth.

When a collapsible tube 49 is inserted into the sleeve 12 as seen in FIG. 11, the sleeve cap 16 is used as a stand to support the collapsible tube 49 inside the sleeve 12. The closure cap 52 of the collapsible tube 49 fits into opening 46 and the collapsible tube 49 is supported in an upright vertical position by sleeve cap 16. This enhances display of the picture or indicia 20 within sleeve 12.

Support ring 34 which is a series of three rings 54, 56 and 58 is used to support opening 26 in sleeve 12. Depending on the diameter of opening 26 and the top circumference of collapsible tube 49 any one of support rings 54, 56 or 58 can be used to firmly mount collapsible tube 49 within sleeve 12.

Indicia or a photograph 20 is placed within flexible support element 18. The support element 18 is then located longitudinally between the outside of collapsible tube 49 and an inner surface of sleeve 12.

The flexible sleeve 12 can be made of polyvinyl chloride, low density polyethylene or other suitable transparent polymer and is produced by known molding techniques. In like manner, the supporting element 18 can be made of polyvinyl chloride or like material and can be opaque on one side and transparent on the other side to enhance display of the indicia or picture 20.

The air release hole 22 is employed to prevent air blockage at the end 24 of sleeve 12.

Equivalent elements can be substituted for the elements employed in this invention to obtain the same results in the same manner.

Having thus described the invention what is claimed and desired to be secured by Letters Patent is:

What is claimed is:

1. A display apparatus for a collapsible tube dispenser, the display apparatus comprising:
   (a) a flexible transparent polymeric sleeve removably enclosing the collapsible tube dispenser, the sleeve having an opening at a top end and closed at a bottom end;
   (b) a flexible polymeric support member comprising two panels hinged together along a common crease removably positioned longitudinally within the sleeve, the support member having at least one panel containing means for displaying indicia and photographs; and
   (c) an annular collar positioned between an inner surface of the sleeve opening at the top end and an outer surface of the collapsible tube.

2. The display apparatus according to claim 1 wherein an inverted sleeve cap supports the collapsible tube in a vertical position.

3. The display apparatus according to claim 2 wherein an opening having serrated edges in the inverted sleeve cap receives a closure cap from the collapsible tube.

4. The display apparatus according to claim 1 wherein the polymeric sleeve is made from polyvinyl chloride.

5. The display apparatus according to claim 1 wherein the flexible polymeric support member is made from polyvinyl chloride and one panel is opaque.

6. The display apparatus according to claim 1 wherein the flexible transparent polymeric sleeve has a hanger element integral with the bottom end.

7. The display apparatus according to claim 1 wherein a bottom portion of the flexible transparent polymeric sleeve has an air release aperture as a means for permitting air to escape.

8. The display apparatus according to claim 1 wherein there is a means for permitting air to escape from the sleeve.

9. A display device for use around a collapsible tube dispenser, the display device comprising:
   (a) a flexible transparent polymeric sleeve removably enclosing the collapsible tube dispenser, the sleeve having an opening at a top end and closed at a bottom end, the bottom end having an integral hanger element extending outwardly in a longitudinal direction from the sleeve;
   (b) a flexible polymeric support member consisting of two panels hinged together along a common crease removably positioned longitudinally within the sleeve between an inside surface of the sleeve and an outside surface of the collapsible tube dispenser, the support member having at least one portion of one panel transparent and the other panel opaque;
   (c) an annular collar positioned between an inner surface of the sleeve opening adjacent the top end opening and an outer surface of a top portion of the collapsible tube; and
   (d) means for permitting air to escape from the sleeve when it is enclosed around the collapsible tube dispenser.

10. The display device according to claim 9 wherein an inverted sleeve cap supports the collapsible tube in a vertical position.

11. The display device according to claim 10 wherein an opening in the center of the inverted cap has serrated edges for receipt of a closure cap from the collapsible tube to display the display device in a vertical position.

12. The display device according to claim 9, wherein the means for permitting air to escape from the sleeve when enclosed around the collapsible tube dispenser is an air release aperture in a wall of the sleeve in a bottom portion of the sleeve.

13. A display device comprising:
   (a) a flexible transparent polymeric sleeve having an opening at a top end and closed at a bottom end;
   (b) a flexible polymeric support member comprising two panels hinged together along a common crease removable positioned longitudinally within the sleeve, the support member having at least one panel containing means for displaying indicia and photographs;
   (c) a sleeve cap closing the opening at the top end of the polymeric sleeve; and
   (d) toiletry items enclosed by the polymeric sleeve selected from the group consisting of a tooth brush, floss, an annular collar and a travel tube of toothpaste.

14. The display device according to claim 13 wherein a collapsible tube dispenser replaces the toiletry items and a means for permitting air to escape is located in a bottom portion of the polymeric sleeve.

15. The display device according to claim 14 wherein the means for permitting air to escape is an air release aperture in a wall of the polymeric sleeve.

16. The display device according to claim 14 wherein the sleeve cap is inverted and a bore in the center of the sleeve cap receives a closure cap from the collapsible tube dispenser so that the display device stands in a vertical position.

17. The display device according to claim 14 wherein the polymeric sleeve has a hanger element integral with a bottom end so that the display device can be hung in a vertical position.

* * * * *